United States Patent [19]

Triplett

[11] Patent Number: 5,059,083
[45] Date of Patent: Oct. 22, 1991

[54] CAMELBACK PALLET TRAILER

[76] Inventor: James T. Triplett, Lancaster Rd., Chester, S.C. 29706

[21] Appl. No.: 409,468

[22] Filed: Sep. 19, 1989

[51] Int. Cl.⁵ ............................................... B60P 1/02
[52] U.S. Cl. ................................. 414/458; 280/425.2; 280/441.1
[58] Field of Search ............... 414/458, 459, 460, 495, 414/498; 280/425.1, 425.2, 441.2

[56] References Cited

U.S. PATENT DOCUMENTS

| | | | |
|---|---|---|---|
| 2,730,376 | 1/1956 | Martin | 280/425.2 |
| 2,822,945 | 2/1958 | Duffy | 280/425.2 X |
| 3,041,087 | 6/1962 | Talbert | 280/425.2 |
| 3,239,237 | 3/1966 | Spencer | 280/762 |
| 3,392,857 | 7/1968 | Tantlinger | 414/458 |
| 3,429,585 | 2/1969 | Ross | 414/458 X |
| 3,520,430 | 7/1970 | Dunbar | 414/458 |
| 3,645,559 | 2/1972 | Stafford | 414/458 X |
| 3,910,606 | 10/1975 | Chisum | 280/425.2 |
| 4,060,145 | 11/1977 | Kingman et al. | 414/495 X |
| 4,746,260 | 5/1988 | Norvell | 414/460 |
| 4,806,065 | 2/1989 | Holt et al. | 414/458 X |
| 4,819,955 | 4/1989 | Cobb | 414/458 X |

FOREIGN PATENT DOCUMENTS

| | | |
|---|---|---|
| 162552 | 11/1985 | European Pat. Off. |
| 1237449 | 3/1967 | Fed. Rep. of Germany ... 280/441.2 |
| 2154619 | 5/1973 | Fed. Rep. of Germany ...... 414/458 |
| 0229835 | 11/1985 | Japan .................................. 414/460 |
| 2388 | 3/1989 | World Int. Prop. O. |

Primary Examiner—David A. Bucci
Attorney, Agent, or Firm—Dority & Manning

[57] ABSTRACT

A tractor trailer is disclosed herein as including linkage structure for the tractor and the rear wheel chassis which are arranged to connect to a trailer bed in the form of a pallet. The pallet is constructed to sit upon the ground at a low height relative to the industry standard, easily mountable by workmen with climbing aids. The linkage structures are nearly identical and utilize hydraulic rams to raise or lower an end of the pallet and place or remove the same relative to their respective wheel chassis. Each of the linkage structures includes pins and link members, some of which may be interconnected to permit the raising and inverting of the rear wheel chassis and placing the same on the tractor chassis for transportation.

11 Claims, 10 Drawing Sheets

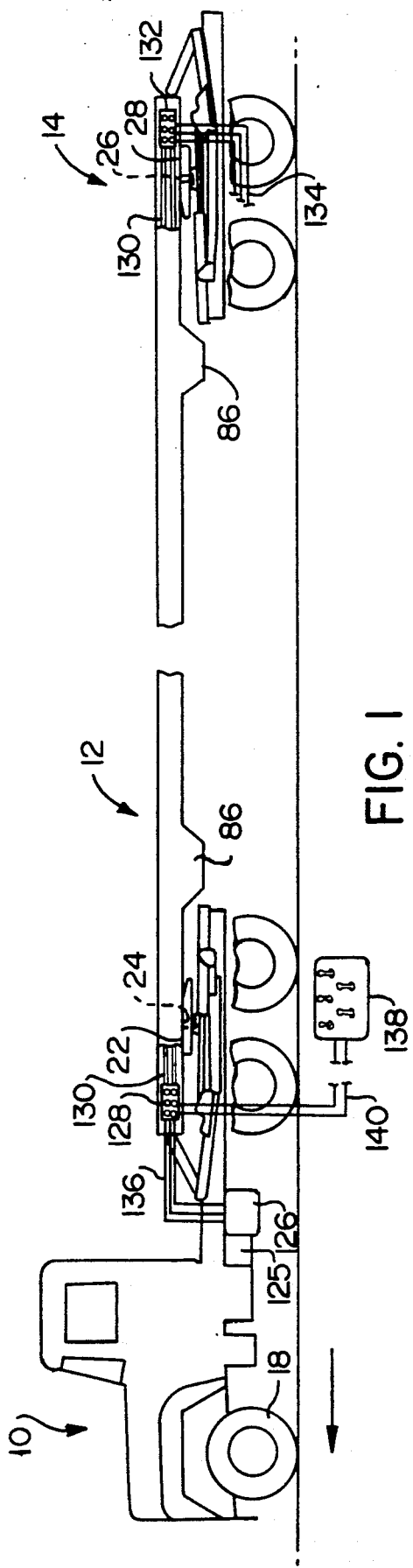

CAMELBACK PALLET TRAILER

BACKGROUND OF THE INVENTION

This invention relates to tractor trailers and, more particularly, to trailers which are adapted for dismounting the load carrying bed whereby the tractor may be separated and the load bed placed in condition for unloading and/or storage.

Present day tractor trailers of the flatbed type most commonly utilized for freight transportation upon the highways include a tractor having a chassis supported on front and rear wheels and, in turn, supporting a fifth wheel structure upon which a detachable load carrying flatbed is swivelably mounted. The rear end of the load bed is supported by a wheel carriage or bogie thus completing the general structural arrangement of the tractor trailer.

Upon delivery of the load bed with a load supported thereon to a terminal for temporary storage or to the site of a user, the forward end of the load bed is detached from the fifth wheel structure and allowed to rest upon wheels or jacks which are normally pivotally supported underneath the load bed. After detachment of the tractor, the flatbed rests upon the rear bogie and the wheel structure or jacks and in the same plane as the load bed assumed during transportation thereof.

One of the standards of the industry concerns the height of the working level for a flatbed or any other load supporting platform such as freight containers and tanks. The height of this level from the surface of the ground is five feet, and serves as the nominal height to which the trucking industry has accepted and adheres to. This particular height, or any other which the industry may agree to accept, has been dictated by the wheeled bogies, tires sizes, axle load and heights, fifth wheel structure, etc. While this particular height of five feet may be acceptable for accommodating the structure of tractor trailers and for safety reasons on the highway, the height has resulted in flatbeds which are inconvenient with respect to unloading and storage within warehouses and other undercover storage facilities. Conventional trailers, when detached from the tractors and placed in storage areas or areas to be unloaded, include the bogie at the rear end thereof which practice thereby prevents additional use of the bogie until the trailer is unloaded and may be removed from its working area.

Another disadvantage inherent in present day tractor trailer units is that the five foot standardization level limits the number of empty flatbeds which may be placed one upon the other for storage. A piggyback combination of one flatbed and bogie upon another, resulting in a height of approximately ten feet is generally the limit to which these units may be stacked in view of the height of conventional warehouse doorways. This limitation requires the provision of additional warehouse floor space for accommodating still more load beds therein.

In the prior art, a conventional tractor trailer is illustrated and described in U.S. Pat. No. 3,057,499 as including a tractor having a fifth wheel structure mounted thereon, a trailer body having its forward end swivelably connected to the fifth wheel structure, and a rear bogie for supporting during transportation and storage the trailer body. In the illustrated arrangement, the trailer body is adapted for movement onto rail cars for further transportation thereof, the bogie, having been removed from the trailer body prior to placement upon the rail cars. Incident to this arrangement, the tractor trailer includes a bogie lift apparatus which permits the placement of the rear bogie upon the tractor chassis for removal of the same from the working site. In this conventional tractor trailer, the rear bogie would normally remain attached to the trailer body during storage of the trailer or unloading therefrom, thus capturing the bogie and prevent use thereof for further transportation with the tractor. In the event that the trailer body is to remain at a working site for any length of time, the bogie and its tractor will be prevented from further utilization unless additional bogies are in inventory for the trucking concern.

Another conventional form of tractor trailer is illustrated in U.S. Pat. No. 3,070,386 as including a tractor having a chassis supported on front and rear wheels and a rear wheeled carriage for supporting a flatbed thereon in conjunction with a fifth wheel structure mounted on the tractor chassis. As in the above referred to patent, the flatbed of this arrangement is of the conventional height above a road surface upon which the tractor trailer operates.

A tractor trailer has been described in U.S. Pat. No. 4,060,145 which permits the unloading of a very heavy load from a flatbed and placed on support pallets. This permits the removal of the complete tractor trailer so that the same may be utilized for other service while the load may be later unloaded and/or placed in condition for working therefrom. In this arrangement, however, additional pallets must be utilized in conjunction with the flatbed of the truck and the platform of the pallets remain as high as or even higher than the level of the flatbed itself. Lifting structure is associated with the rear bogie of the trailer and the tractor fifth wheel structure so that the flatbed may be lifted along with the pallets during transportation and then lowered to permit the movement of the trailer from underneath the pallet supported thereon.

Another form of demountable transporter associated with tractor trailers is disclosed in U.S. Pat. No. 4,231,709. This arrangement is devised specifically for ISO containers which have been designed and accepted by the industry with standard fittings of a particular configuration for permitting universal handling, such as, transportation hoisting and positioning these containers on container ships, specially designed railroad cars and flatbed trucks. This patent is directed to demountable transporters for attachment to the containers, the transporters including wheels, lifting and lowering mechanism which will permit the transportation of the containers upon the wheels along the highway. While this disclosure is adapted for particular containers, it does not serve the handling of loads which are not contained within these types of containers which in themselves serve as the trailer structure.

In the industry, there are also other arrangements which disclose the structures which will permit the attachment of rear bogies to a tractor chassis for permitting the removal of the moving parts of the tractor trailer to another site for further use thereof. As shown in U.S. Pat. Nos. 2,151,343, 2,296,858, 3,239,237, various arrangements have been illustrated and described which will connect the flatbed having a rear bogie attached thereto to structure associated with the truck tractor.

Therefore, it is the principal object of the present invention to arrange a flatbed associated with a tractor trailer which is detachably related to the tractor chassis and a rear bogie so that the flatbed itself becomes and remains a pallet for the load thereon.

Another object of the invention is to permit the removal of a flatbed with load thereon from a tractor chassis and a rear bogie and to lower the same upon the ground to a height easily accessible to an operator or worker to step up and step down easily without an additional structure.

Still another object of the invention is to utilize the structure which raises or lowers a flatbed from attended tractor structure and rear bogie for use as means for mounting the rear bogie upon the tractor chassis thereby enabling the return of the units to another working site for further use thereof.

The present invention has been devised in order to overcome the disadvantages and problems enumerated above with respect to conventional tractor trailers of the flatbed type. The present invention has been devised for accomplishing the objects by arranging the flatbed so that it becomes a pallet for the load supported thereon, and whereby the pallet has a working level much below the standard level of five feet so that the same may be easily transported within a covered warehouse to a work site whereat workers may easily mount pallet and selectively unload the same. In accomplishing these goals, both the wheel carriages for the tractor and the rear bogie include linkage structure and hydraulic rams for articulating the same for operation to lower the flatbed or pallet from the transporting level thereof of five feet to a significantly lower level. Hydraulic fluid under pressure is conducted to each of the hydraulic ram systems through a path which includes the load bed or pallet so that an operator may raise or lower the pallet and disconnect the same from the respective wheeled units from a remote and single position. The linkage structure for both the rear bogie and the tractor wheel carriage are devised so that the rear bogie may be lifted vertically, and to an inverted position upon the tractor chassis and locked in this position for transporting both carriages to another site.

These and other advantages will become apparent from the following description taken in conjunction with the accompanying drawings wherein:

BRIEF DESCRIPTION OF THE DRAWINGS

FIG. 1 is an elevational view of a tractor trailer arranged according to the invention for transportation along a highway;

FIG. 2 is an elevational view of the tractor trailer showing the flatbed between the tractor and rear bogie being moved downwardly therebetween;

Figure 3:
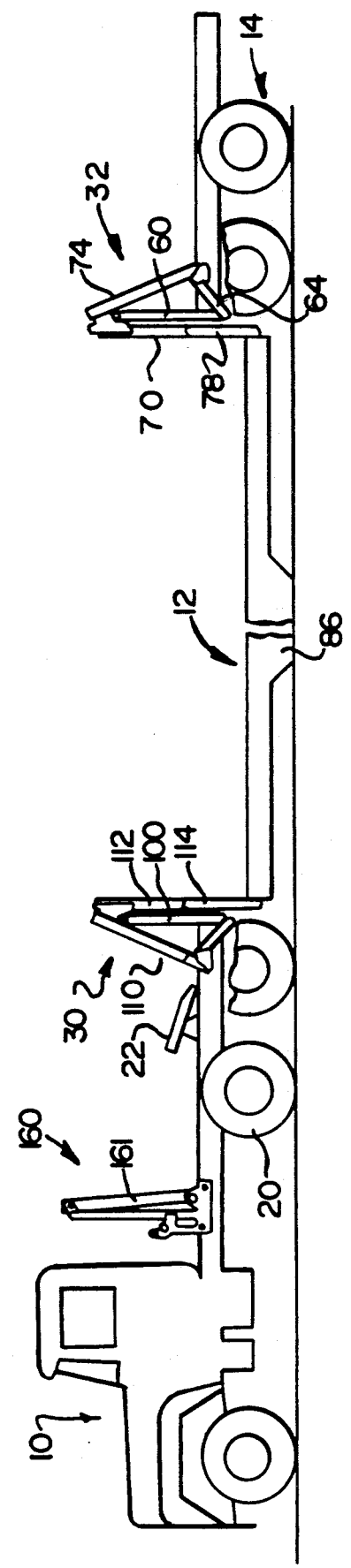
FIG. 3 is an elevational view of the tractor trailer showing movement of the flatbed upon the ground wherein the flatbed now serves as a load pallet.

While the teachings of the present invention as will be discussed below has been described in relation to a specific illustrative embodiment, it will be understood that the invention may take various modifications and alternate constructions. In particular, the illustrative embodiment is directed to a flatbed type of tractor trailer, but the invention is applicable to a wide variety of other road vehicles such as freight trailer bodies and tank cars, vans, containers, trash boxes, etc.

As shown in FIG. 1, the tractor trailer to which the present invention has been applied includes in combination a tractor 10 having a trailer in the form of a flatbed 12 and a rear wheel carriage or bogie 14 detachably attached to the rear end of the flatbed. The tractor 10 is provided with a chassis 16 supported on front and rear wheels 18, 20, respectively, and wherein the chassis supports a fifth wheel structure 22 cooperable with a kingpin 24 secured to and depending downwardly from the front end of the flatbed 12.

The rear end of the flatbed 12 is also provided with a downwardly depending kingpin 26 cooperable with a fifth wheel structure 28 mounted on the bogie or rear wheel carriage 14.

The wheel carriage associated with the tractor 10 and including the tandem wheels 20 supports an articulating linkage structure generally indicated by the reference numeral 30 detachably secured to the adjacent end of the flatbed 12 for lowering this end of the flatbed from the position shown in FIG. 1 to the position shown in FIG. 3. Similarly, the rear wheeled carriage or bogie 14 is provided with an articulating linkage structure 32 supported on the bogie for lowering the rear end of the flatbed in conjunction with the structure 30.

Figure 4:
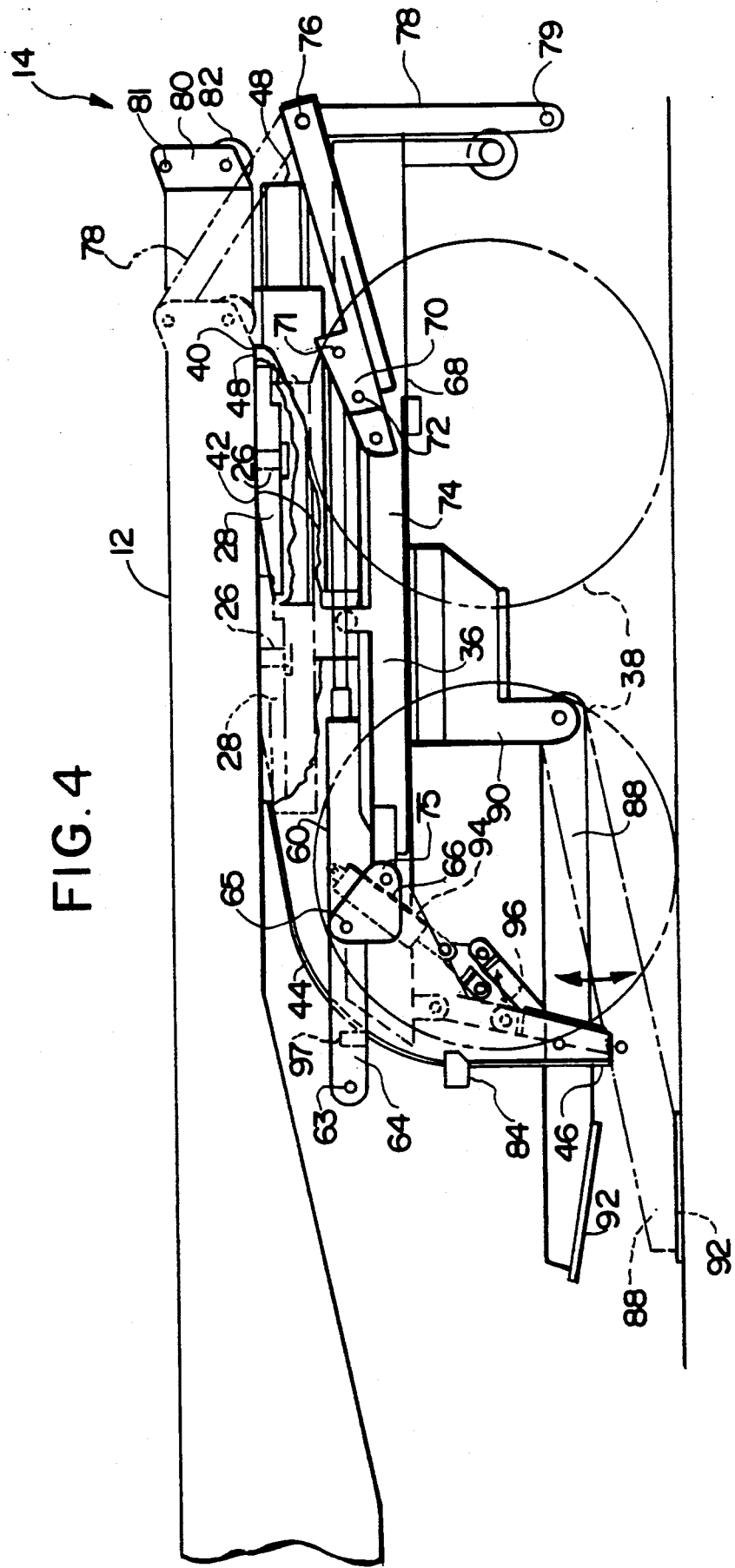
FIG. 4 is a fragmentary elevational view of a rear bogie as a flat bed or pallet is being readied for lowering.
Figure 5:
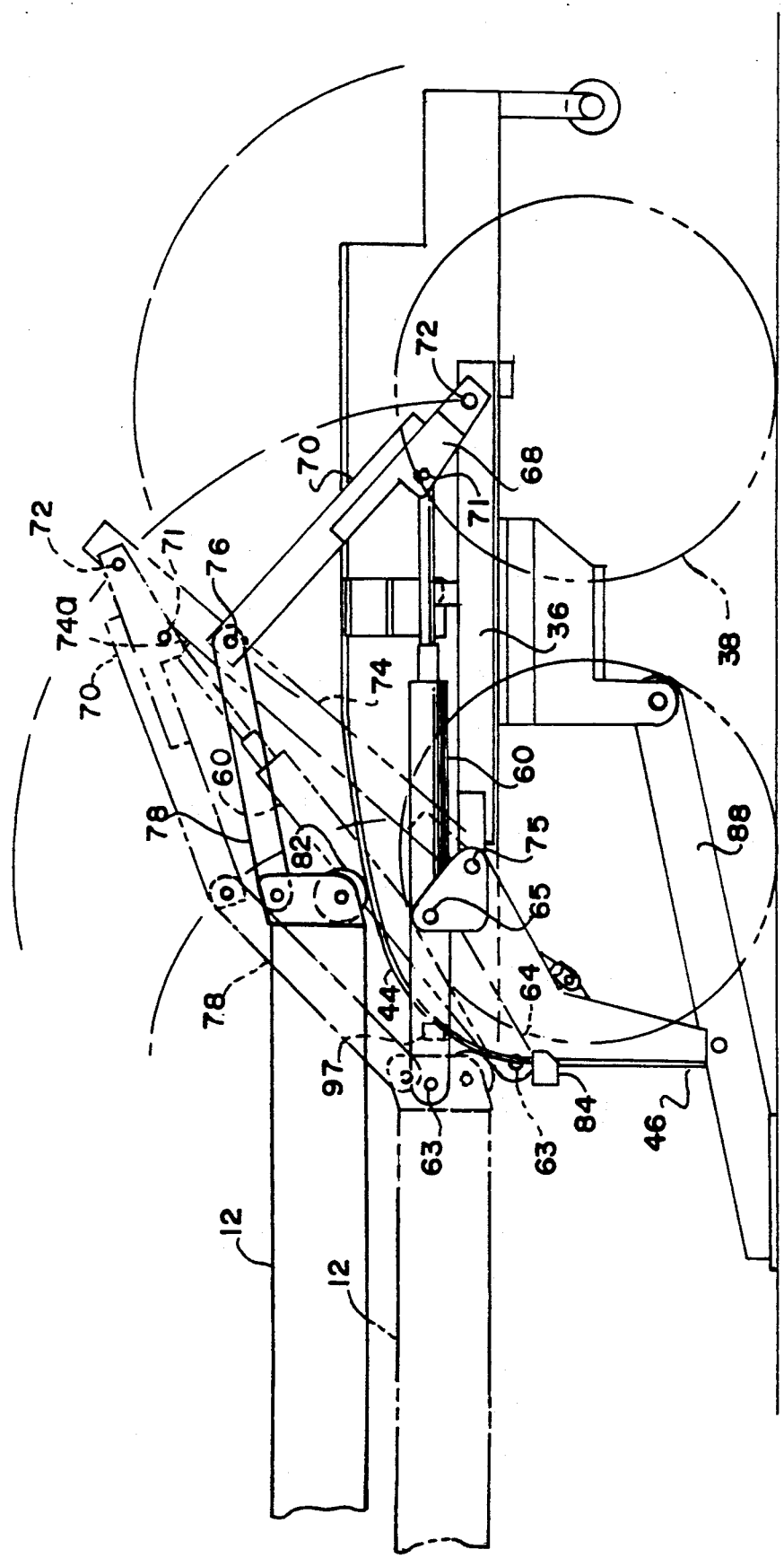
FIG. 5 is similar to FIG. 4 but showing further movement of the pallet relative to the bogie.
Figure 6:
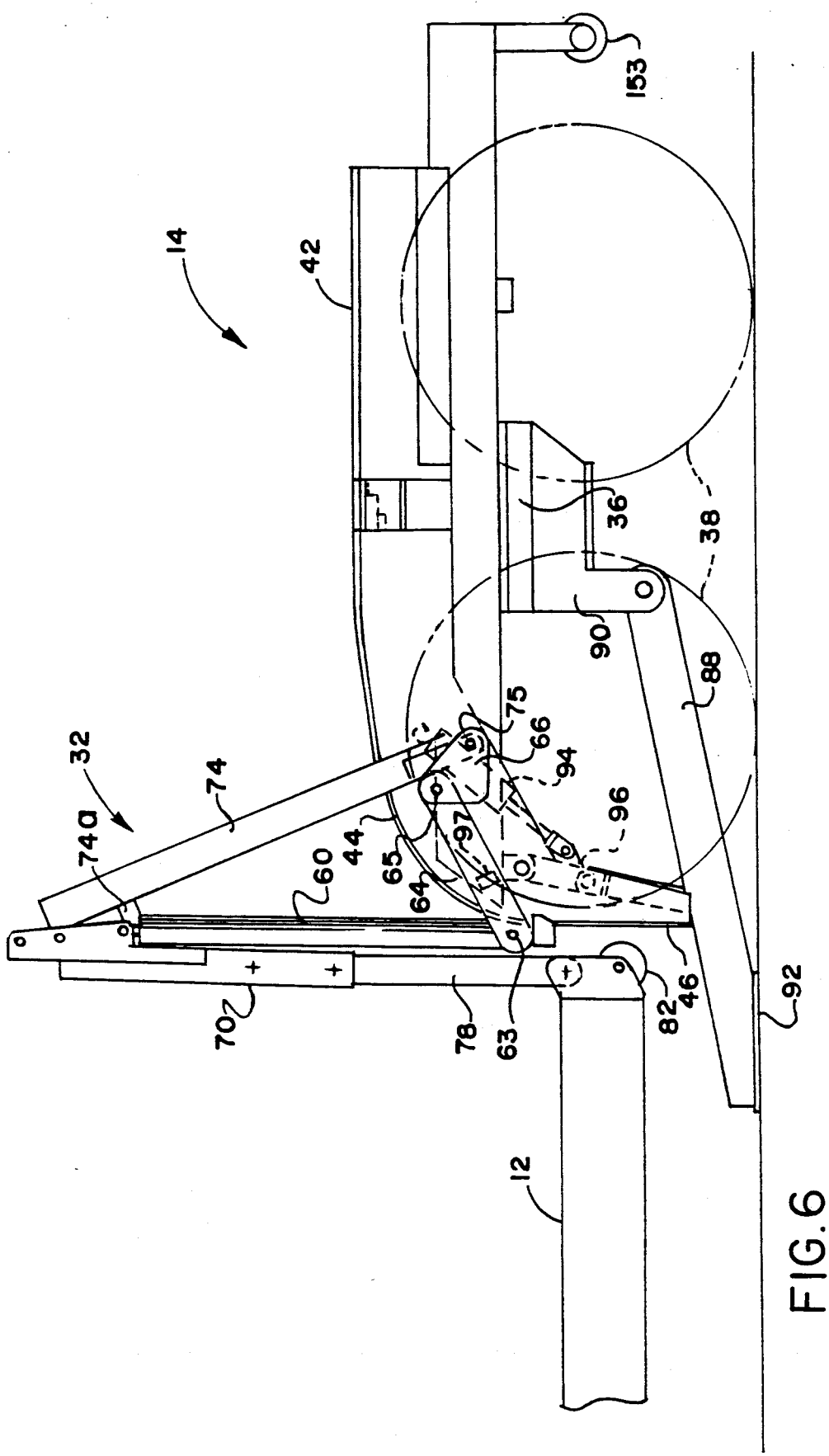
FIG. 6 is similar to FIG. 4 showing the completion of lowering of the pallet relative to the bogie.

As shown in FIGS. 4, 5, and 6, the rear wheel carriage 14 comprises a frame chassis 36 supported by wheels 38 suitably mounted on axles and springs in the conventional manner. Mounted on the chassis 36 above and inside the wheels 38 is a pair of rail members 40, 41 arranged in parallel and having a horizontal rail section 42 along the center portion of the bogie 14, a curved section 44 which curves downwardly as the rails project toward the flatbed 12, and in a straight and generally vertical section 46.

Figure 7:
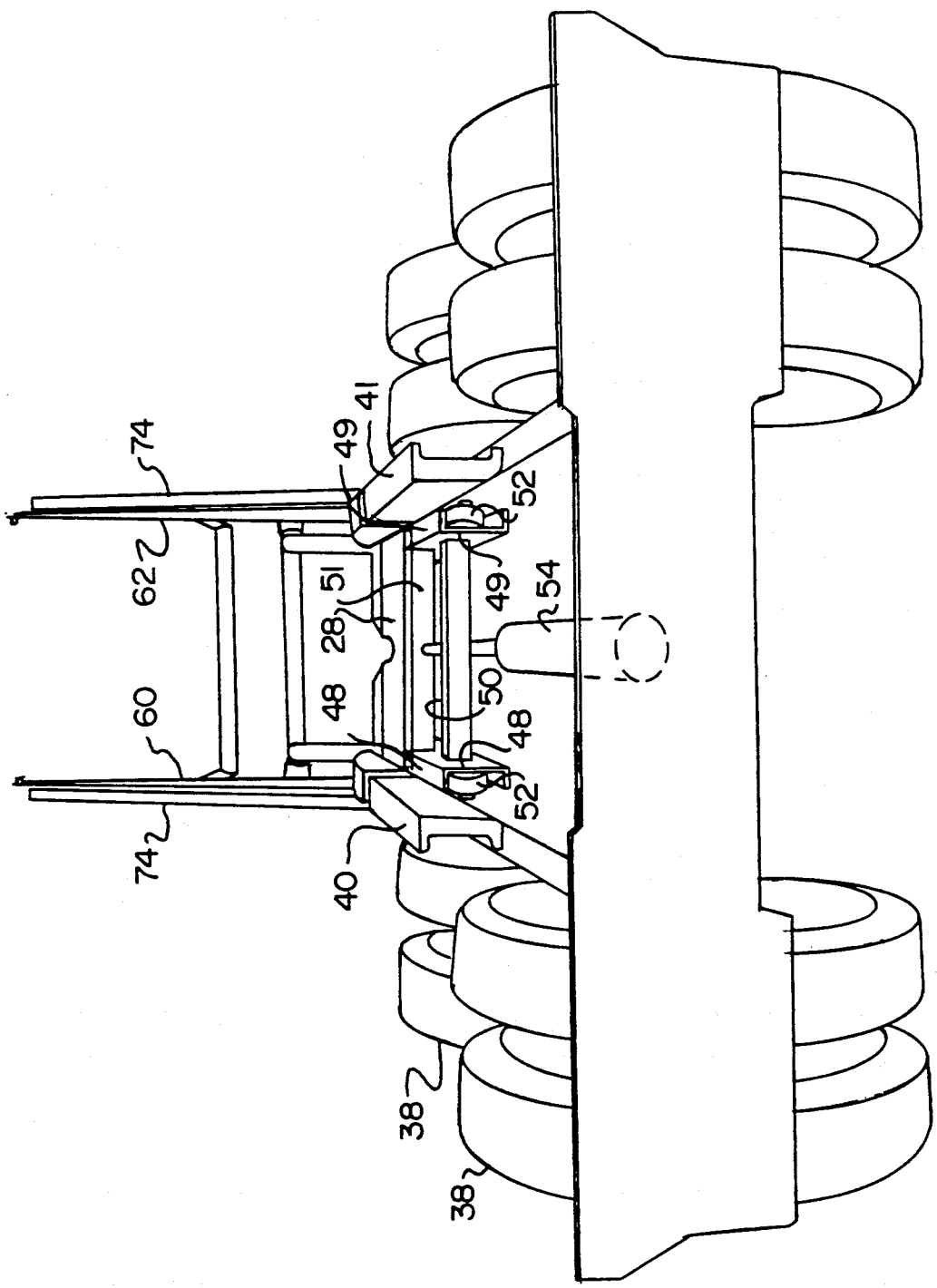
FIG. 7 is an end view of the rear trailer bogie.

Mounted inwardly of the rail members 40, 41 is a second pair of rails 48, 49 in the form of U-shape channel members upon which the fifth wheel structure 28 is secured. As shown in FIG. 7, the rail members 48, 49 are arranged in parallel being separated by and connected together by structural members 50, 51. The rails 48, 49 are adapted to move in unison upon wheels 52 rotatably cooperable within the rails and secured for rotation upon suitable structural elements of the chassis 36. The wheels 52 allow limited reciprocable movement of the rail members 48, 49 between forward and rear positions relative to the carriage 14 in order to move the fifth wheel structure 28 supported thereon for a purpose to be described below. In order to move the frame structure comprising the rails 48, 49, selectively between the forward and rear positions, a hydraulic ram 54 is supported upon the chassis 36 between the rails 48, 49. The hydraulic ram 54 has one end secured to the chassis 36 and the other end to the structural member 51.

As shown in FIG. 4, the link structure 32 normally assumes a retracted position where all of the structural members for the linkage structure are folded upon and within the bogie 14. The linkage structure 32 is operatively connected to a pair of parallel arranged hydraulic rams 60, 62 positioned one on each side of the rails 40, 41, respectively, and inwardly of the wheels 38. The cylinder for the hydraulic ram 60 is pivotally mounted at its end by a pivot pin 63 to one end and between a pair of cylinder pivot arms 64 which have their other ends pivotally connected by a pivot pin 65 to a triangular shaped pivot plate 66 secured to the chassis 36. The piston end of the ram 60 is pivotally connected to a projection 68 formed on a swing arm member 70 by a pivot pin 71, the member 70 in turn being pivotally connected by a pivot pin 72 to a base arm member 74 pivotally mounted on the triangular plate 66 by a pivot pin 75.

The other end of the swing arm member 70 pivotally supports by a pivot pin 76 a lower link member 78 formed with a pivot opening 79 at its other end. As mentioned above, the linkage structure associated with the hydraulic ram 62 on the right side of the bogie 14 as viewed from the rear of the bogie is identical to the linkage structure described above and performs the same operations as will be described below. For brevity reasons, each of the linkage members and pivots for both the left side and the right side of the bogie 14 will utilize the same reference numerals and will be described as in pairs.

As shown in FIG. 4, the hydraulic rams 60, 62 and linkages 64 are in longitudinal alignment which occurs during normal transportation of the tractor trailer. The rear end of the pallet 12 is formed with centrally positioned protruding plates 80 formed with openings 81 at the upper ends and supporting wheels 82 at the lower ends thereof. The wheels 82 are spaced and adapted to ride on each of the rails 40, 41 when the pallet 12 is being lowered or raised relative the ground indicated by the positions shown in FIGS. 1-3. Normally, pallet 12 is in a retracted position as shown by full lines in FIG. 4 whereupon the lower surface of the pallet 12 rests upon the fifth wheel structure 28.

In normal operation of the linkage structure 32 for the rear bogie 14 from the position shown in FIG. 1 to the position shown in FIG. 3, as provided by the sequential operations of the parts viewed in FIGS. 4-6, the operator initially activates the hydraulic ram 54 to extend the same to move the fifth wheel structure 28 from its rearmost position shown in full lines to its forwardmost position shown in dotted lines. This action moves the pallet 12 and the tractor 10 to the left, as viewed in FIGS. 1 and 4, a distance needed to place the wheels 82 upon the rails 40, 41, preferably 24 inches. To assure these movements, the bogie 14 is suitably braked to prevent rearward movement, and the brakes on the tractor 10 are released. After these movements, the wheels 82 are placed upon the rails 40, 41 and the plates 80 are in position to be connected to the lower arms 78. The operator manually connects the lower link members 78 to the plates 80 by means of suitable pivot pins being inserted through the openings 81 and 79 when these have been aligned as shown in dotted positions in FIG. 4. After these movements of the parts, the hydraulic ram 54 is again activated to return the fifth wheel structure 28 to its rear position. The wheels 82 are now positioned upon the rails 40, 41 and the plates 80 are in position to be connected to the lower arms 78.

The operator next energizes or provides fluid under pressure to the hydraulic rams 60, 62 which are programmed to slowly retract their respective piston rods. Retraction of the hydraulic rams commences the counterclockwise pivoting movement of the swing arms 70 about pivot points 72. Continued activation of the hydraulic rams 60, 62 continues the rotation of the swing arm members 70 from the position shown in FIG. 4 to the position shown in FIG. 5. During this sequence of operation, the wheels 82, which support the rear end of the pallet 12 upon the top surface of the rail members 40, 41, ride along the horizontal section 42 and starts the slow descent as the wheels ride along the curved sections 44 of the rail members.

Further retraction of the rams 60, 62 from the position shown in FIG. 5 cause the swing arm members 70 to come against stops 74a carried on arms 74 and initiates the counterclockwise rotation of the base arm members 74 about the pivot pins 75. This action also commences rotation of the hydraulic rams 60, 62 and the cylinder pivot arms 64 about the pivot pins 65. This latter rotation continues until the ends of the pivot arms 64 at which the pivot pins 63 are located engages stop elements 84 which terminate the pivotal movement of the pivot arms 64 but allows the hydraulic rams 60, 62 to continue further pivotal movement about the pivot pins 63.

Throughout this latter sequence of movement, the rear end of the pallet 12 continued its downward movement along the curved sections 44 and then along the vertical sections 46. Still further retraction of the rams 60, 62 rotates the same to a nearly vertical orientation as shown by dotted lines in FIG. 6 whereat the rams 60, 62 are in their fully retracted condition. The structural dimensions of the rams, the lower links 78, the swing arms 70, and the base arms 74 are such that upon completion of the articulation of the link members, the pallet 12 will rest upon the ground by virtue of foot elements 86 formed on the bottom of the pallet 12.

In order to prevent rocking movement or even slight rotation of the wheel carriage or bogie 14 in a counterclockwise direction as viewed in FIG. 4, the chassis 36 is provided with outrigger arms 88 on the sides of the chassis inwardly of the wheels 38. Each of the outrigger arms 88 are pivotally mounted at one end to a support structure 90 arranged below the chassis. The outrigger arms 88 are formed with support pads 92 which engage the ground upon activation by means of hydraulic rams 94, 95 connected at one end to the chassis and at the other end to linkage mechanisms 96. The rams 94 are arranged to articulate to produce lowering and raising of the pads 92 from the full line position where the same is normally out of the way during transportation of the tractor trailer to a dotted line position wherein the pads 92 engage the ground to support the bogie 14 against rocking movement during lowering and raising of the pallet 12. Lowering of the outrigger arms is preferably initiated prior to the initial movement of the pallet under actuation of the ram 54.

After the pallet 12 has been placed upon the ground, the operator removes the pins which connect the lower link members 78 to the plates 80. The hydraulic rams 60, 62 are reactivated to extend the same from the fully retracted condition, as shown in FIG. 6, which action commences rotation of the rams about the pivot pins 63 and clockwise rotation of the base arms 74 about the pivot points 75. As the rams commence extending, the cylinder pivot arms 64 remain in the dotted line positions shown in FIG. 5 until the arms 64 and the ram become once again aligned as shown in FIG. 5. This alignment occurs when the cylinder for the ram 60 becomes seated in a saddle 97 located between the arms 64 adjacent the pivot 65. When seated, the ram 60 is prevented from further rotation about the pivot 63 and further actuation results in its pivoting about the pivot 65. Continued extension of the rams continues the clockwise rotation of the same and the arms 64 about the pivot pins 65 and the rotation of the base arms 74 about the pivot points 75 until the end of the base arms adjacent the extension or projections 68 reaches suitable stops not shown for stopping further rotation of the base arms, as shown in FIG. 5. Further extension of the rams 60, 62 continues the pivotal movement of the swing arms 70 to the position shown in FIG. 4 whereupon the pivot pin which connects the lower member 78 to the plates 80 by way of openings 78, 81 is removed so that the lower link members 78 may be rotated manually to their inoperative position, as shown in FIG. 4.

In raising a load placed upon the pallet 12 from a resting position upon the ground, operation of the linkage 32 is the reverse of that described above in lowering the pallet to the ground. In this sequence of operation, the linkage structure 32 is brought to the position shown in FIG. 6 by the sequence of operation described above when lowering the pallet except for the connection of the lower members to the plates 80. When the linkage mechanism 32 is in this position, the operator connects the lower link members 78 to the plates 80 by means of suitable pivot pins inserted in the aligned openings 79, 81.

The hydraulic rams 60, 62 are activated to activate the linkages 78, 70, 74 and rams as described above in returning these parts to their normally inoperative position. During this operation, the wheels 82 roll vertically upwardly along the rail section 46 as the rams 60, 62 commence extending to rotate the same and the base arms 74 about the pivot pins 63, 75, respectively. In moving from the position shown in FIG. 6 to that shown in FIG. 5, the wheels 82 rotate upon the curved track sections 44 to continue the lifting of the pallet 12.

As the linkage members continue their movement from the position shown in FIG. 5 to the position shown in FIG. 4, the base arms 74 engage suitable stops so that the continued extension of the rams 60, 62 provide the counterclockwise rotation of the swing arms 70 to continue the movement of the pallet upwardly and along the horizontal portion 42 of the rails 40, 41.

In the position shown in FIG. 4, the rams are fully extended and the end of the pallet 12 is in position for the kingpin 26 to enter and engage the slot in the fifth wheel structure 28. The pallet 12 is now loaded on the carriage 14 as far as the linkages 32 can pull it. Upon this occurrence, the hydraulic ram 54 is activated to move the fifth wheel structure 28 from its rearmost position where it normally resides during raising or lowering of the pallet as described above, to its forward position whereat the fifth wheel will engage and become locked to the kingpin 26. In this position of the parts, the operator removes the pins connecting the lower link arms 78 to the plates 80. After locking, the ram 54 is again activated to retract the same to move the pallet 12 to the right, as viewed in FIG. 4 in full lines.

The linkage structure 30 associated with the tractor chassis 16 is identical to the linkage structure 32 in that structure which is related to the raising and lowering of the pallet 12 as was described above. In the interest of brevity, the operation of the linkage structure 30 will not be described and only like structural elements will be mentioned in relation to that described in detail above for the linkage structure 32.

Figures 8, 9:
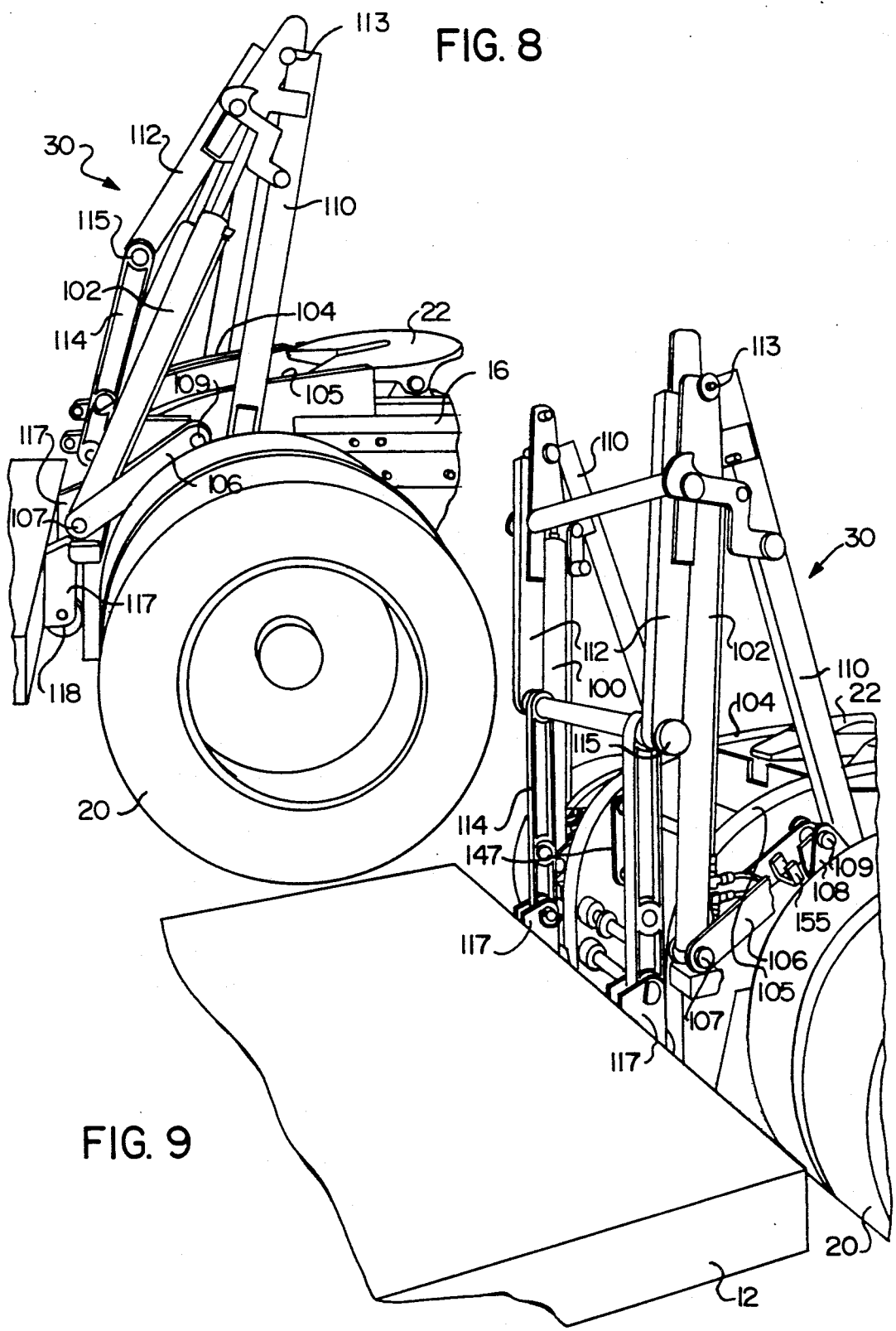
FIGS. 8 and 9 are isometric views of the rear chassis of the tractor showing the mechanism for lowering the pallet.

As shown in FIGS. 8 and 9, the linkage structure 30 includes hydraulic rams 100, 102 which are identical to rams 60, 62 and perform the same function. Mounted on the chassis 16 on either side of the fifth wheel structure 22 are rail members 104, 105 which are equivalent to rail members 40, 41, respectively, but do not have the extent of length provided for the sections 42. Similarly, the linkage structure 30 includes cylinder pivot arms 106 pivotally connected by pivot pins 107 to the rams 100, 102, triangular plates 108 pivotally connecting by pivot pins 109 the other ends of the arms 106, base arms 110 pivotally connected by pivot pins 111 to the plates 108, swing arms 112 pivotally connected by pivot pins 113 to the outer ends of the base arms 110 and lower link arms 114 pivotally connected by pivot pins 115 to the outer ends of the swing arms 112, are equivalent to pivot arms 64, pin 63, triangular plates 66, pin 65, base arm members 74, pin 75, swing arms 70, pin 72, lower arm members 114, and pins 76, respectively, which are associated with the linkage structure 32. The piston rods for the rams 100, 102 are pivotally connected by pivot pins 116 to an extension formed on the swing arms 112 thereby being equivalent to pivot pins 71 for the arms 70.

In cooperation with the rail surfaces associated with the rail members 104, 105, the adjacent end of the pallet 12 has spaced plates 117 secured thereto for supporting wheels 118 which serve the same function as the wheels 82 supported at the other end of the pallet adjacent the rear wheel carriage 14. The upper end of the plates 117 are formed with pivot openings 120 for receiving a pin for connecting the lower arm members 114 thereto in the same manner as the lower arms 78 are detachably attached to the plates 80.

In operation, the linkage structure 30 operates in exactly the same manner as the linkage structure 32 and the parts associated therewith. Since movement of the fifth wheel structure 28 associated with the bogie 14 is utilized to lock both kingpins 24, 26 in their respective fifth wheel structures, and for separating the tractor wheel carriage and the bogie 14 to permit the downward or upward movement of the pallet 12 during the raising and lowering thereof, only the arrangement relative to the movement of a fifth wheel structure 28 is described. Therefore, the wheel carriage for the tractor 10 does not include structure for moving the fifth wheel structure 22 such as the rails 48, 49 and the hydraulic ram 54.

The hydraulic rams 54, 60, 62, 94, 95, 100 and 102 are activated by means of a source of fluid pressure mounted in the tractor 10. A power take-off device 124 may be operatively connected to the truck drive motor in the tractor 10 for driving a fluid pump 125 for supplying the valves V-1-V-4 with fluid under pressure. As shown in FIG. 1, the pallet 12 is equipped with fluid receptacles 128 at one corner of its forward end and, in turn, is connected by fluid lines 130 arranged along the entire length of the pallet to corresponding fluid receptacles 132 located at the rear corner. Suitable fluid hoses 134 from the rams 54, 60, 62, 94, 95 and normally stored in the bogie 14 are detachably connected to the receptacles 132. Other suitable hoses 136 serve to connect the fluid receptacles 128 to the hydraulic rams to the fluid receptacle 132 associated with the wheeled carriage for the chassis 16.

Figure 12:
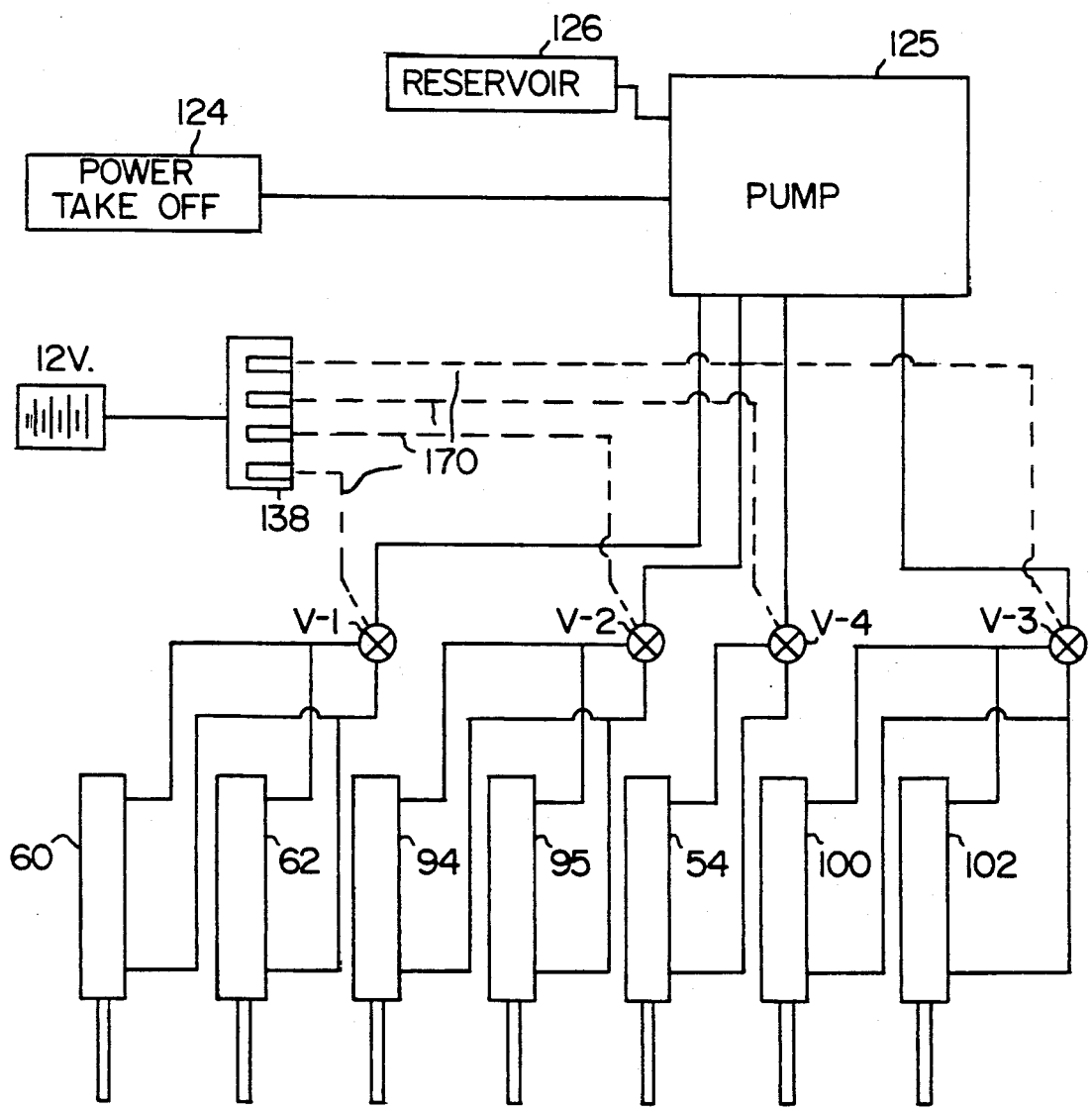
FIG. 12 is a schematic of the hydraulic system for controlling various operations of the present invention.

As shown in FIG. 12, a remote control device 138 comprising a bank of electrical switches are electrically connected by conductors to solenoid valves V-1-V-4 associated with all of the rams for permitting remote activation of the same by an operator manipulating the control device 138. The control device 138 has four switches which are used for selectively operating the valves V-1-V-4. A cable 140 comprising these conductors and having a suitable length permits the operator to walk around the truck and trailer for personally viewing the operation of each of the linkages 30, 32 during the raising and lowering of the pallet 12.

Another aspect of the invention is the arrangement whereby the linkage structures 30, 32 are also adapted to connect the rear bogie 14 to the tractor chassis 16 and hydraulic rams 100, 102 activated to raise the rear bogie, to invert and position the same upon the tractor chassis for piggyback transportation.

Figure 10:
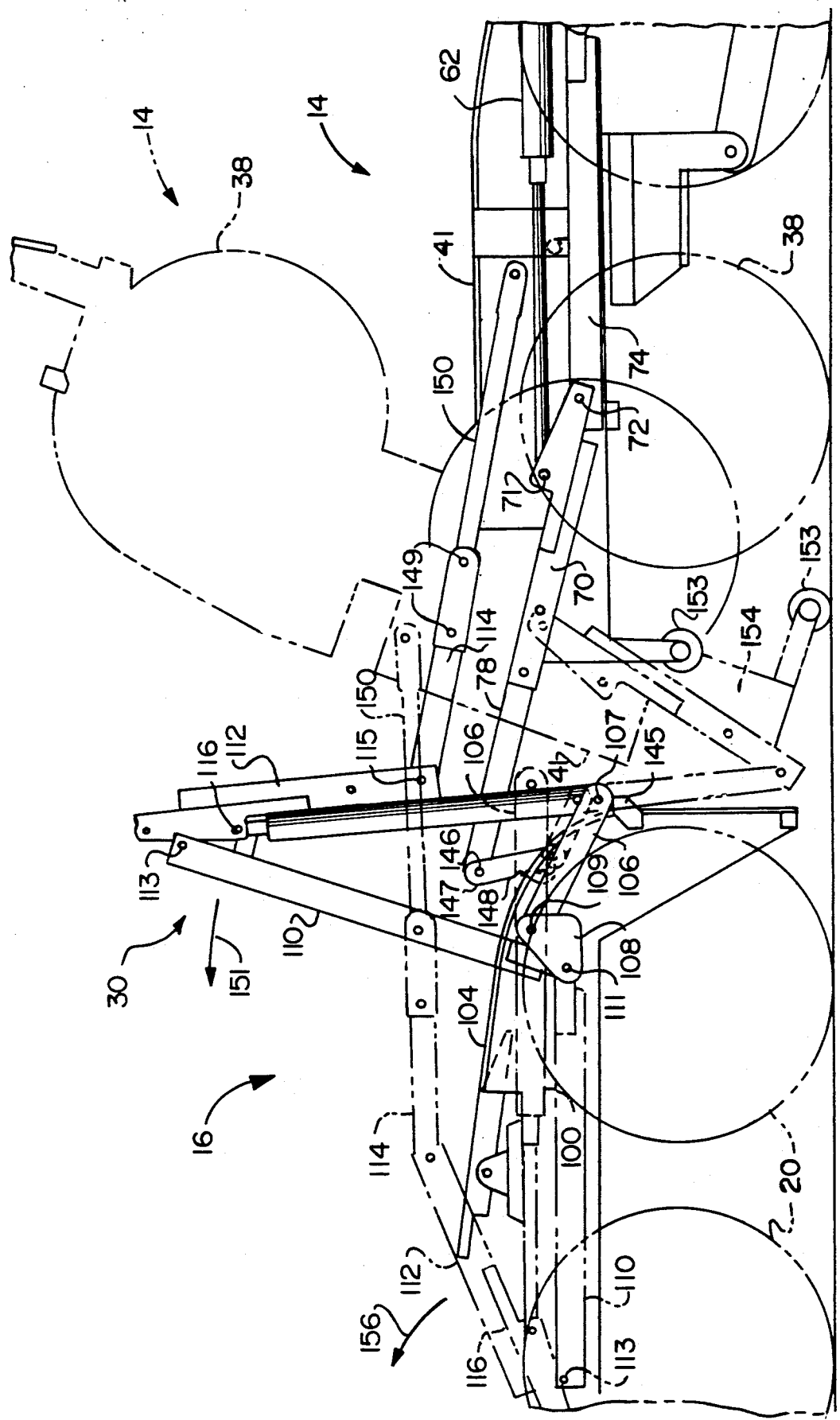
FIGS. 10 and 11 are fragmentary elevational views of the rear bogie being lifted and inverted upon the tractor wheel chassis.
Figure 11:
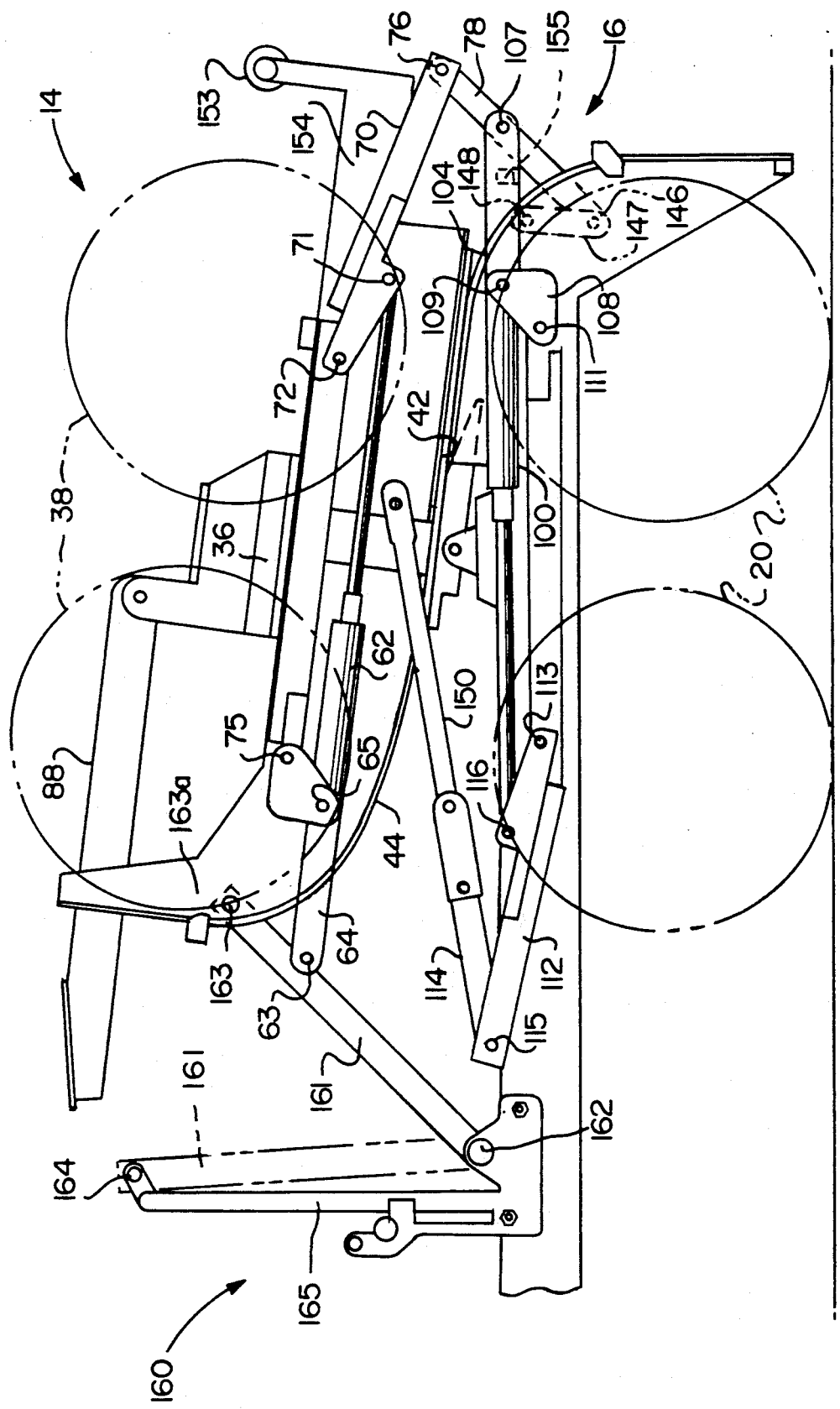

As shown in FIGS. 10 and 11, the bogie 14 is shown in end-to-end relationship with the tractor chassis 16 after the same has been driven to and backed up to the rear of the bogie so that various elements of the linkage 30 may be connected to some elements of the linkage 30 preparatory to the raising and inverting the bogie 14 onto the chassis 16 for eventual piggyback transportation. To condition the respective linkages 30, 32 for this operation, the linkage 32 is placed in the position shown in FIG. 4, and the linkage 30 is placed in the position shown in FIG. 9. In this orientation, the lower ends of the link members 106 are against a stop 145 and is equivalent to stop 84 associated with the linkage 32.

The operator initiates the piggyback orientation by connecting the loose ends of the lower arms 78 by means of pivot pins 146, each to a link member 147 pivotally retained by pins 148 on the chassis for the carriage 16. After this connection is made, the lower arms 114 for the linkage 30 are each connected by two pins 149 to link members 150 pivotally retained on the chassis 36 for the bogie 14. It will be noted that the members 114 and 150 are in longitudinal alignment and will remain rigid by virtue of the pins 149. The wheel carriages are now in condition for the piggyback actuating as shown in full lines in FIG. 10. Since the linkage 30 is in the orientation shown in FIG. 10, the hydraulic rams 100, 102, illustrated by full lines, are fully retracted.

The operator next commences activation of the hydraulic rams 100, 102 utilizing the appropriate switches on the remote control device 138. Initial reaction to the activation of the rams to extend the same, produces counterclockwise rotation of the base arms 110 about the pivots 111, as indicated by the arrow 151, and the rotation of the rams 100, 102 about the pivots 107. As these two elements rotate, the swing arms 112 and the lower arms 114 start the counterclockwise pivoting movement of the bogie about the axis of the adjacent wheels 38 as the bogie approaches its position shown in dotted lines in FIG. 10.

Continued rotation of the bogie 14 places a transverse rod 153, secured to the chassis 38 by a plate 154, upon the ground whereupon continued extension of the ram 100, 102 effects rotation of the bogie 14 about the rod 153. As shown in dotted lines, as the rod 153 reaches the ground, the rams 100, 102 are seated in saddles 155 (see FIGS. 9 and 11) mounted within the link members 106, the base arms 110 have contacted suitable stops on the chassis 16 and the swing arms 112 have been moved to positions for counterclockwise rotation for the continued rotation of the bogie 14.

As the rams 100, 102 continue their extension from their horizontal position shown in dotted lines in FIG. 10, the swing arms 112 rotate in a counterclockwise direction as indicated by the arrow 156 to continue the rotation of the bogie 14. Eventually, this operation places the rails 40, 41 against the curved sections of the corresponding rails 104, 105. As the rams extend, the bogie is raised up as the straight sections 42 slide and rotate upon the rails 104, 105 until the bogie 14 is positioned upon and in an inverted position upon the chassis 16, as shown in FIG. 12. In this orientation, the rails 40, 41 will be positioned upon the corresponding rails 104, 105. In order to minimize wear and tear, suitable flat wooden boards may be placed and locked upon the rails 40 and 41 when the parts are in the positions shown in FIG. 10 so as to prevent metal-to-metal sliding contact.

After the bogie 14 is centrally positioned upon the chassis 16, as shown in FIG. 11, the operator connects various link members forward and to the rear of the assembled wheel carriage to lock the same tightly for transportation. To this end, the chassis 16 is provided with a superstructure generally indicated by the reference numeral 160. The superstructure includes a pair of parallel arranged link elements 161 pivotally retained at their lower ends upon the chassis for the truck by pivot pins 162.

The outer ends of links 161 have built-in sliding pins 163 that can be manually manipulated so as to extend them laterally out from the links 161.

As a result, the links 161 can be locked in a non-use position such as shown in a substantially vertical position as shown in FIG. 11 wherein the pins extend through an opening 164 carried on top of the vertically extending frame 165. The linkage arms 161 are also used for holding down the chassis 14 by extending the sliding pins laterally outwardly through an opening carried in a plate 163a provided on the chassis frame 36.

Similarly, the rear of the bogie can be locked down for transportation by use of a locking link arm (not shown) extending from the chassis to the lever arm 78 or by any other suitable means.

It will be apparent that the raising of the pallet 12 with a load placed thereon by the link structures 30, 32 will be the reverse procedure described above in regard to the lowering of the pallet from the position shown in FIG. 1 to that of FIG. 3. Further operation, after the connections of the link members have been established as shown in FIG. 3, the rams 60, 62, 100, 102 are extended to raise the pallet 12 from the position shown in FIG. 3, to that of FIG. 1 going through, of course, the intermediate position as shown in FIG. 2. Similarly, to remove the bogie 14 from the position shown in FIG. 11 to that in full lines in FIG. 10 requires only the reverse procedure described above in mounting the bogie upon the tractor.

In any of these procedures, the hydraulic/electrical circuitry of FIG. 12 is utilized to activate the double acting hydraulic rams involved. As noted, the ram pairs 60/62, 94/95, 100/102 and the ram 54 are under the control of solenoid valves V-1, V-2, V-3 and V-4, respectively, receiving electrical power through conductors 170 from a source of d.c. voltage. Control of the valves is made available from the remote bank of switches in the device 138 through the extended cable 142 which allow the operator the control function anywhere around the periphery of the tractor trailer.

From the foregoing it will be appreciated that the present invention provides an arrangement for tractor trailers wherein the trailer may be dismounted from the tractor and rear wheel carriage or bogie and placed upon the ground at a height easily accessible by workers without the aid of ladders or steps whereby a load may be easily loaded or a load previously placed on the trailer may be easily removed. The trailer may also be utilized as a pallet whereby the load may be worked upon at an enclosed work station, or the pallet may be utilized as a convenient supply source. Because of the pallet form of trailer, many such pallets may be stored one upon the other, taking minimal floor and height space. It will also be appreciated that the mechanisms utilized to mount and dismount a trailer may be utilized to raise and invert the rear wheel chassis upon the tractor chassis and to lock the units together for transportation to another site.

While the preferred embodiment of the various aspects of the invention has been described using specific terms and arrangements, such descriptions are for illustrative purposes only, and it is to be understood that changes and variations may be made without departing from the scope of the following claims.

That which is claimed is:

1. A tractor trailer having a load bed adapted for use as a pallet supporting a load during transportation and/or storage on the ground, the combination comprising:
   a tractor having a chassis, wheels attached to said chassis for supporting said tractor, and defining a front wheel carriage;
   a fifth wheel mechanism carried on said chassis;
   a rear wheel carriage;
   a load supporting pallet arranged between said wheel carriages having one end adapted for coupling to said fifth wheel mechanism, and the other end adapted to be connected to said rear wheel carriage for movement therewith during transportation; and
   hydraulically operated lift mechanism carried by said front wheel carriage and said rear wheel carriage for raising said load supporting pallet from the ground up on said front wheel and rear wheel carriages; and
   guide means carried on said front wheel chassis for guiding said one end of said load supporting pallet up over the wheels onto said fifth wheel.

2. The tractor trailer defined in claim 1 including means mounted in said rear carriage for moving said tractor during lowering of said pallet.

3. The tractor trailer defined in claim 1 wherein each of said wheel carriages includes said guide means incorporating downwardly curved tracks and wherein the ends of said pallet has rollers mounted thereon cooperable with said tracks respectively during lowering of said pallet.

4. The tractor trailer defined in claim 1 wherein said operative means is adapted to raise said pallet from the ground surface to a position for transportation.

5. The tractor trailer as set forth in claim 1 further comprising
   a fifth wheel mounted for reciprocal movement on said rear wheel carriage; and
   means for shifting said fifth wheel rearwardly on said rear wheel carriage to move said load supporting pallet rearwardly on said chassis.

6. The tractor trailer as set forth in claim 5 further comprising:
   said means for shifting said fifth wheel shifting said load supporting pallet forwardly prior to said hydraulically operated lift mechanism lowering said load supporting pallet to the ground.

7. A tractor trailer having a load bed adapted for supporting a load during transportation and/or storage, the combination comprising:
   a tractor having a fifth wheel mechanism adapted for coupling and transporting wheeled trailers, and a front wheel carriage,
   a rear wheel carriage,
   a load supporting pallet arranged between said wheel carriages having one end coupling directly to said fifth wheel mechanism, and the other end connected to said rear wheel carriage for movement therewith during transportation,
   detachable link members operatively connected between each of said carriages and the respective end of said pallet, and
   power drive means arranged on each of said carriages and operatively connected to the respective link members, for lowering the respective end of said pallet to the ground surface whereat attachment or detachment of the ends of said pallet is achieved.

8. The tractor trailer defined in claim 7 including means mounted in said rear carriage for moving said tractor and said pallet during lowering of said pallet.

9. The tractor trailer defined in claim 7 wherein each of said wheel carriages includes
   downwardly curved tracks and wherein the ends of said pallet has rollers mounted thereon cooperable with said tracks respectively during raising and lowering of said pallet.

10. The tractor trailer defined in claim 7 wherein said power drive means includes a fluid cylinder/piston unit.

11. A tractor trailer including a tractor having a fifth wheel mechanism and a wheel carriage associated therewith, a rear wheel carriage and a load bed connected between the tractor wheel carriage and the rear wheel carriage, the combination comprising:
   link means detachably connected between each of said wheel carriages and an end of the load bed and arranged for selectively disconnecting the load bed therefrom, said link means for said tractor being disengaging said fifth wheel mechanism from direct engagement with said end of said load bed associated therewith,
   energizing power means connected to said link members for selectively raising or lowering the load bed, and
   manual control means operatively connected to said power means and being operable from a single remote position.

* * * * *